UNITED STATES PATENT OFFICE.

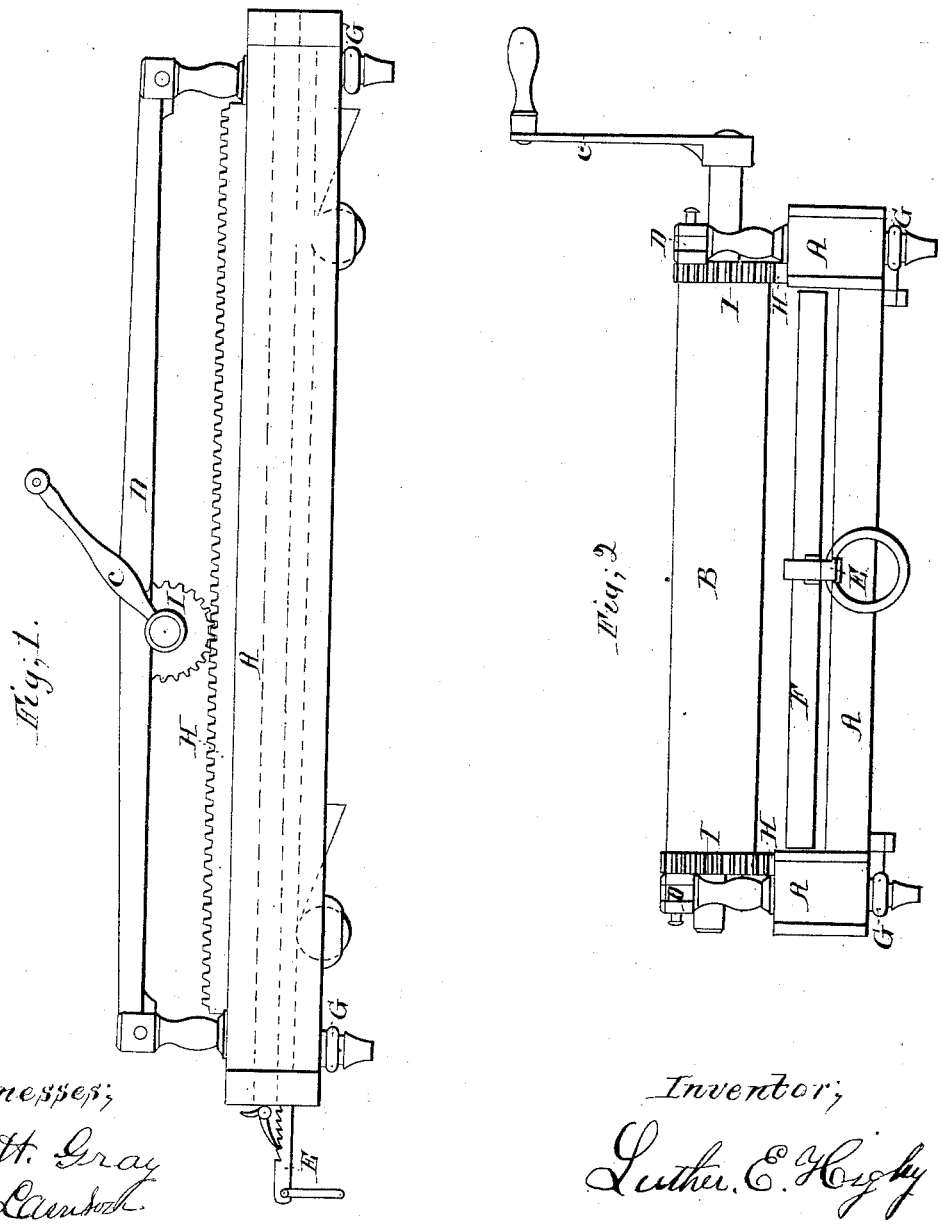

L. E. HIGBY, OF SHELBURNE FALLS, MASSACHUSETTS.

PASTRY-BOARD.

Specification of Letters Patent No. 26,989, dated January 31, 1860.

*To all whom it may concern:*

Be it known that I, LUTHER E. HIGBY, of Shelburne Falls, in Franklin county, State of Massachusetts, have invented a new and useful Pastry-Board and Rolling-Pin Combined for Making All Kinds of Pastry, Crackers, &c.; and I do hereby declare that the following is a full, clear, and exact description of the construction and operation of the same.

The machine consists of a frame-work A, A, the side pieces A, being deeper than the cross pieces A. The pastry board is fitted in between the side pieces A. On the upper side of each side pieces A, is secured a rack H, in which works a pinion I, that is secured on each end of the rolling pin B, that works to and fro over the pastry board, by the working crank C. This rack and pinion keeps the rolling pin parallel with the pastry board. The rolling pin is kept in its place by the top pieces D. These are placed just above the crank shaft at each end of the rolling pin. The pastry board F is made to rise and fall by an inclined plane which is worked by drawing out the piece E, which raises the pastry board. To get the required thickness of the pastry, on the piece marked E is a ratchet which holds the pastry board in the desired place. By removing a pin on the front end of the pieces D they can be raised so as to remove the rolling pin. The machine stands on four legs.

What I claim and desire to secure by Letters Patent, is—

The combination and arrangement of the frame A, rolling pin B, crank C, pieces D, with the adjustable board F, rack H, and pinion I, substantially, as and for the purpose specified.

LUTHER E. HIGBY.

Witnesses:
E. H. GRAY,
C. G. LAMSON.